United States Patent
Li et al.

(10) Patent No.: US 10,628,079 B1
(45) Date of Patent: Apr. 21, 2020

(54) DATA CACHING FOR TIME-SERIES ANALYSIS APPLICATION

(71) Applicant: EMC Corporation, Hopkinton, MA (US)

(72) Inventors: Sanping Li, Beijing (CN); Yu Cao, Beijing (CN); Junping Zhao, Beijing (CN); Zhe Dong, Beijing (CN); Accela Zhao, Shanghai (CN); John Cardente, Milford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 258 days.

(21) Appl. No.: 15/167,222

(22) Filed: May 27, 2016

(51) Int. Cl.
*G06F 3/06* (2006.01)
*G06F 12/0802* (2016.01)

(52) U.S. Cl.
CPC .......... *G06F 3/0656* (2013.01); *G06F 3/0604* (2013.01); *G06F 3/0673* (2013.01); *G06F 12/0802* (2013.01); *G06F 2212/604* (2013.01)

(58) Field of Classification Search
CPC .... G06F 3/0604; G06F 3/0656; G06F 3/0673; G06F 12/0802; G06F 2212/604; G06F 2212/45; G06F 2212/46; G06F 2212/468; G06F 2212/314; G06F 2212/6024; G06F 12/0862; G06F 8/4442
USPC ....... 711/118, 133, 136, 154, 156, 158, 159, 711/160
See application file for complete search history.

(56) References Cited

U.S. PATENT DOCUMENTS

| | | | | |
|---|---|---|---|---|
| 5,305,389 | A * | 4/1994 | Palmer | G06F 12/0862 382/100 |
| 6,415,368 | B1 * | 7/2002 | Glance | G06F 17/30902 707/E17.12 |
| 9,239,794 | B1 * | 1/2016 | Merchant | G06F 12/0862 |
| 2008/0215546 | A1 * | 9/2008 | Baum | G06F 16/2272 |
| 2009/0018798 | A1 * | 1/2009 | Dorneich | G06F 17/18 702/179 |
| 2012/0072656 | A1 * | 3/2012 | Archak | G06F 17/30132 711/104 |
| 2015/0242326 | A1 * | 8/2015 | Jayaprakash | G06F 12/0862 711/137 |
| 2016/0055186 | A1 * | 2/2016 | Courtney | G06F 3/0605 707/752 |
| 2016/0055211 | A1 * | 2/2016 | Courtney | G06F 17/30321 707/770 |
| 2016/0092484 | A1 * | 3/2016 | Finkler | G06F 17/30336 707/715 |

(Continued)

OTHER PUBLICATIONS

Yang, Q., Zhang, H.H., and H. Zhang, "Taylor Series Prediction: A Cache Replacement Policy Based on Second-Order Trend Analysis," Proceeding HICSS-34 2001, vol. 5, p. 5023.*

(Continued)

*Primary Examiner* — Tracy A Warren
(74) *Attorney, Agent, or Firm* — Ryan, Mason & Lewis, LLP

(57) ABSTRACT

A time-series data cache is operatively coupled between a time-series analytics application program and a time-series data store, and configured to temporarily store portions of the time-series data. The time-series data store is configured to persistently store time-series data. The time-series data cache is further configured to be responsive to one or more data read requests received from the time-series analytics application program.

20 Claims, 5 Drawing Sheets

(56) References Cited

U.S. PATENT DOCUMENTS

| | | | | |
|---|---|---|---|---|
| 2016/0179936 A1* | 6/2016 | Mathur | ............ | G06Q 40/00 |
| | | | | 707/752 |
| 2017/0010816 A1* | 1/2017 | Chen | ............ | G06F 17/30516 |
| 2017/0206164 A1* | 7/2017 | Choi | ............ | G06F 12/0871 |
| 2017/0308482 A1* | 10/2017 | Alatorre | ............ | G06F 12/126 |
| 2017/0344468 A1* | 11/2017 | Kirshenbaum | ....... | G06F 12/023 |

OTHER PUBLICATIONS

Reddy, M. and G.P. Fletcher, "An adaptive nechanism for web browser cache management," IEEE Computing Jan./Feb. 1998.*

\* cited by examiner

300

400

DATA CACHING FOR TIME-SERIES ANALYSIS APPLICATION

FIELD

The field relates generally to data management, and more particularly to management of time-series data in accordance with time-series analysis application programs.

BACKGROUND

As illustratively defined by the International Telecommunication Union in ITU-T Recommendation Y.2060 dated June 2012, the "Internet of Things" (IoT) is a global infrastructure for the information society, enabling advanced services by interconnecting (physical and virtual) things based on existing and evolving interoperable information and communication technologies. For example, in a typical IoT deployment, there are a large amount of electronically interconnected devices with different capabilities. The IoT devices can form a heterogeneous ad-hoc network wherein diverse devices such as, for example, sensors, actuators, radio frequency identification (RFID) tags, and smartphones, interact with each other to achieve a common goal with no or very little underlying infrastructure support.

In one illustrative IoT deployment, a large number of sensors may continuously produce a significant amount of time-series data, which creates a correspondingly significant demand for time-series data analysis such as, e.g., pattern recognition and visualization. Such time-series analysis can be useful in a variety of scenarios including, but not limited to, economic forecasting, sales forecasting, budgetary analysis, stock market analysis, yield projections, workload projections, and process quality control. However, managing the large amounts of time-series data can be a significant challenge for existing time-series analysis systems.

SUMMARY

Embodiments of the invention provide improved time-series data management techniques.

For example, in one embodiment, a time-series analysis system comprises the following components. A time-series data cache is operatively coupled between a time-series analytics application program and a time-series data store, and configured to temporarily store portions of the time-series data. The time-series data store is configured to persistently store time-series data. The time-series data cache is further configured to be responsive to one or more data read requests received from the time-series analytics application program.

Advantageously, illustrative techniques provide a time-series data cache that leverages the inherent temporal characteristics in time-series data and also provides a mechanism for predicting a next data access time, as will be explained in detail herein.

These and other features and advantages of the invention will become more readily apparent from the accompanying drawings and the following detailed description.

DETAILED DESCRIPTION

Figure 1:
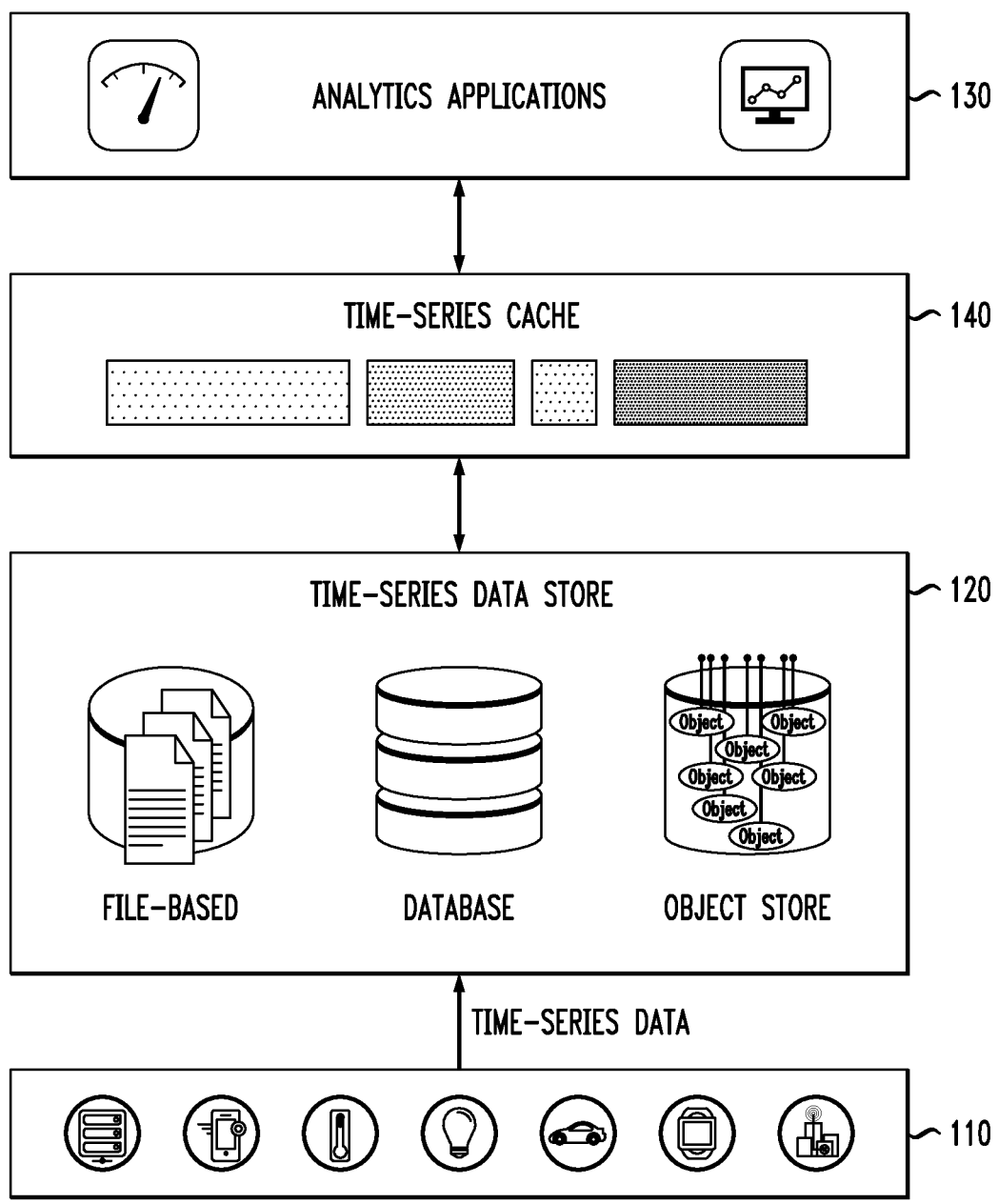
FIG. 1 illustrates a time-series data analysis system, according to an embodiment of the invention.

Illustrative embodiments may be described herein with reference to exemplary cloud infrastructure, data repositories, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud environment," "cloud computing platform," "cloud infrastructure," "data repository," "data center," "data processing system," "computing system," "data storage system," "data lake," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

As illustratively used herein, "time-series data" is a sequence of data points (e.g., objects, items, etc.) collected over time.

As mentioned above, in recent years, the evolution of the IoT has resulted in the deployment of massive numbers of sensors in various fields. These sensors continuously produce a significant amount of time-series data, which thus creates a significant demand for time-series data analysis. However, it is realized herein that existing analysis on time-series data suffers from low efficiency and high latency in the data acquiring process due to the high frequency of data transmission between the data store where the time-series data is stored (maintained) and the analysis applications.

Normally, implementations of time-series data stores are dedicated to providing data storage and a data access interface for time-series data, e.g., arrays of numbers indexed by time. Typical data stores may include a time-series database, flat-file-based storage, and object storage. Applications perform input/output (I/O) operations via data access interfaces, for example, representational state transfer (RESTful) application programming interfaces (APIs), with the data store.

In a typical time-series application infrastructure, some monitoring tools require the latest time-series data for tracking and visualizing, while other mining tools are attempting to quickly find associations between multiple measures and thus will send data requests for multiple measures with a certain datetime or datetime range. A large number of data read requests with variant measures and time ranges inevitably leads to a significant amount of repeated data transmissions from the time-series data stores to the analysis applications.

Hence, there is a need to provide an efficient data acquisition mechanism for time-series data analysis applications. In illustrative embodiments, a time-series caching design for analytics applications is provided. Such a time-series data cache leverages the inherent temporal characteristics in time-series data and also provides a mechanism for predicting a next data access time.

In terms of time-series data, illustrative embodiments take into account its inherent temporal characteristics to enhance caching efficacy. Specifically, in one illustrative embodiment, timespan information associated with a data block is used to improve the cache space utilization. In a further illustrative embodiment, the timespan information is incorporated into the criteria for cache replacement. Then, by considering the past and present access patterns, future access time of a specific data block is predicted in order to make a more intelligent caching decision for the time-series data. The cache design according to embodiments of the invention serves to reduce data requests response times for time-series analysis applications.

Raw time-series data is typically a sequence of data points with a format such as: {measure, timestamp, value}. Analytics applications typically send data read requests with a specification such as: {measure, datetime/datetime range} for certain measures. A large number of data read requests with variant measures and datetime ranges would inevitably lead to a significant amount of repeated data transmissions from time-series data stores to analysis applications. Therefore, in accordance with illustrative embodiments, a dedicated caching design speeds up data acquisition so as to quickly feed data into the analytics applications.

Classical caching algorithms, such as Least Recently Used (LRU), Greedy-Dual Size (GD-Size), Greedy-Dual Size Frequency (GDSF), etc., commonly keep track of the most recently accessed objects/pages. Higher priority is assigned to the objects that are accessed most recently, while rarely used ones are replaced, i.e., primarily relying on past access trends. However, such common designs for existing caching fail to capture access trends where the reference changes in the near future.

On the other hand, these classical caching algorithms are designed for the problem of general data access acceleration, without considering the inherent characteristics of the particular data type. Data in the cache is normally either a hit or a miss scenario when handling data requests. But, for the time-series data, there is a complex set relation between the datetime range in the request and timespan of the cached data block. If there is no design consideration for the cases such as partial hit/miss and set inclusion in terms of datetime range, the caching efficiency might be greatly reduced. For example, assume a data block {entity, [start(1), end(3)]} is maintained at a cache, and a read request {entity, [start(2), end(4)]} is received, where start(1)<start(2)<end(3)<end(4). Thus, there is an intersection between the data block and the request from the point of view of set theory, but they do not completely match. Typically, the request would be considered a cache miss. If this scenario is simply considered to be a cache miss in the typical way, it would result in unnecessary data retransmission. Similarly, such complex set relations would also lead to changes on the access reference.

Accordingly, embodiments of the invention provide an efficient and quick data acquisition methodology and mechanism for time-series data analysis applications. More specifically, illustrative embodiments provide a time-series caching design dedicated to analytics applications which leverages the inherent temporal characteristics in time-series data and a prediction mechanism for a next data access time adapted to one or more classical cache algorithms.

FIG. 1 illustrates a time-series data analysis system 100, according to an embodiment of the invention. As shown, time-series data sources 110 send time-series data to time-series data store 120 which receives and stores the time-series data. The time-series data can come from any suitable source(s). For example, as mentioned above, a network of IoT devices can serve as a source of time-series data. However, embodiments of the invention are not necessarily limited to IoT networks. Time-series data store 120 may include, but is not limited to, a time-series database, flat-file-based storage, and object storage (as illustratively shown).

One or more analytics applications 130 are configured to request and obtain time-series data from a time-series data cache 140, as will be explained in further detail herein. Time-series data cache 140 is itself configured to obtain time-series data from time-series data store 120. Thus, if the cache 140 does not contain the requested data, the data is obtained from data store 120. However, when the cache 140 does contain the requested data, the data is sent from the cache to the applications 130. The advantage in serving the data read request from data stored in the cache is that a more costly (in terms of time and/or processing consumption) data read to the data store is avoided. The time series data cache 140 is preferably implemented on the same host device (e.g., host) upon which the analytics applications 130 are hosted, while the time-series data store 120 is typically implemented on a processing device (e.g., storage array) remote from the host and coupled via a communications network. Rather than multiple processing devices, the system 100 could alternatively be implemented on a single processing device.

As mentioned above, time-series data has inherent temporal characteristics. Raw time-series data is typically a sequence of data points with a data point format such as: {measure, timestamp, value}. Typically, the metrics of a specific measurement item are grouped and sorted by time, then stored in the database or object store. The time-series data may or may not be supplemented by a variety of metadata in order to speed up data retrieving.

For simplicity, we call any measurement item an entity, for example, the temperature in the product environment, or the CPU utilization of an instance in a cloud infrastructure. A data block belongs to a certain entity, consisting of a specific timespan and corresponding metrics, denoted as: {entity, [start, end]}.

Thus, a timespan is a time period having a start time and end time, and consecutive time instances (typically equally spaced) in between. Thus, an analytics application may request the data points associated with a particular measurement item (or entity) for one or more particular timespans. A set of data points within a given timespan may be considered a data block, wherein a data point may occur at each time instance of the given timespan. Each data point, as mentioned above, includes a data value for the specific measurement item (entity) at a specific time instance.

Figure 2:
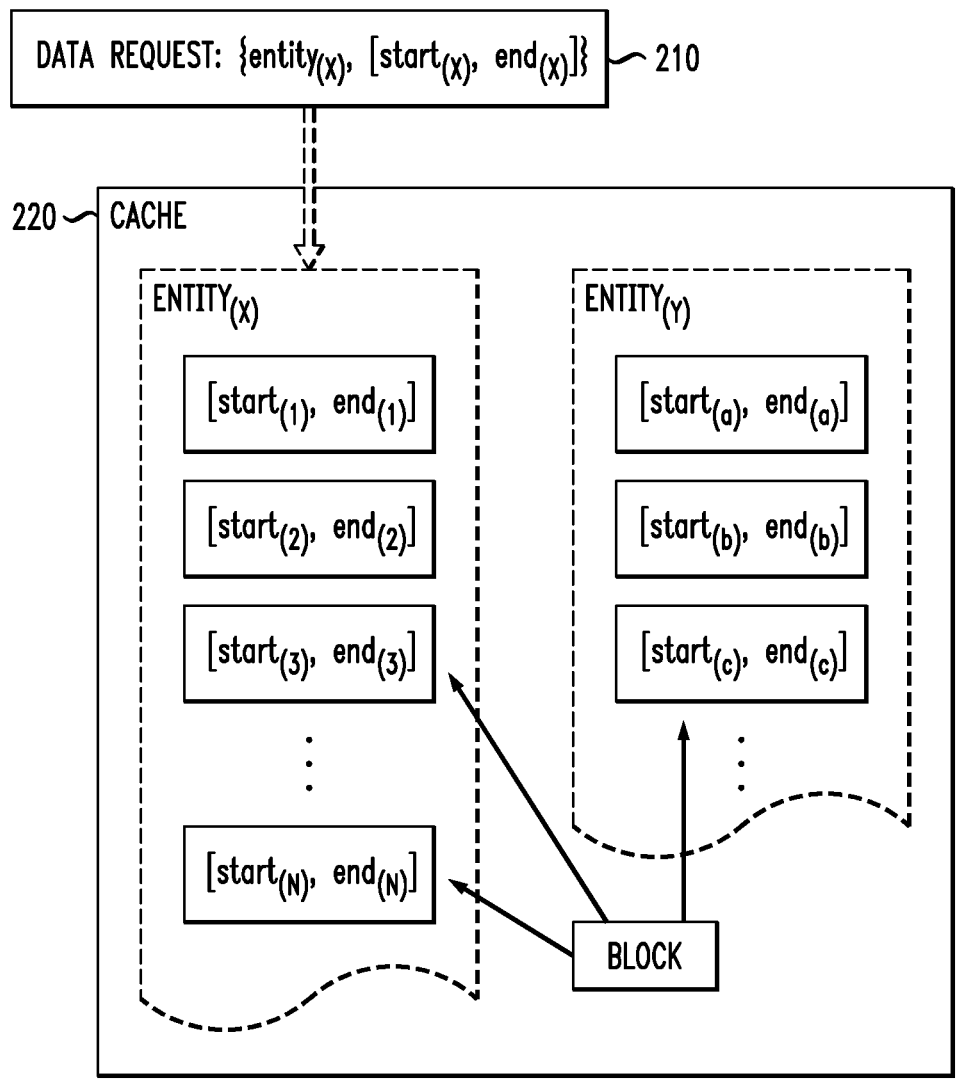
FIG. 2 illustrates a data request being sent to a time-series data cache, according to an embodiment of the invention.

For a given data access scenario, an illustrative embodiment searches for data blocks in the time-series data cache 140. FIG. 2 illustrates an example operation 200 wherein a data request is sent by an analysis application to a time-series data cache. As shown, the application sends data read request 210 for the data block {entity$_{(X)}$, [start$_{(X)}$, end$_{(X)}$]}. Data blocks, belonging to different entities, have been loaded in time-series data cache 220, for example, entity$_{(X)}$ and entity$_{(Y)}$. Each entity contains a set of blocks with variant timespans.

The caching design according to illustrative embodiments gives full consideration to the temporal characteristics inherent in the data with the purpose of providing high-performance data access to time-series analysis applications. Specifically, the caching design guarantees timespans for a specific entity do not overlap each other. The cache design increases the cache space utilization by avoiding multiple copies of small time slices. Furthermore, the caching design predicts a next access time using past and present access trends and then utilizes the prediction as to whether or not the data block would be accessed in the near future to generate better cache replacement policies.

Analytics applications continuously send data requests for different entities with variant timespans. This scenario would gradually create overlap in the timespan distribution for a certain entity in the time-series cache, if there is no specific optimization. These repeated timespan slices would inevitably result in low utilization of the cache space. Therefore, illustrative embodiments provide an optimization policy by taking into account the inherent temporal characteristics of time-series data when processing data requests with a specified timespan.

Assume an analytics application sends a data read request with a specified entity and timespan, for example, {entity (X), [start(X), end(X)]}, as shown in FIG. 2. We now describe, in the context of FIG. 3, the detailed processing in the time-series cache 140 according to different cases concerning timespans in the data request.

Figure 3:
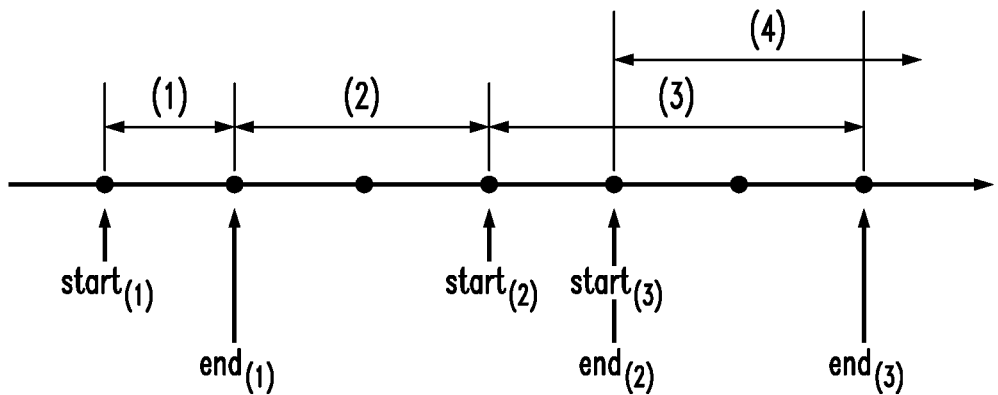
FIG. 3 illustrates data read cases for a time-series data cache, according to an embodiment of the invention.

Thus, FIG. 3 illustrates data read cases for a time-series data cache 140 with respect to an illustrative timeline 300.

Case (1). In this data read case, the data request timespan is falling into one of an existing timespan of data blocks already loaded in the cache 140, for example, [start(1), end(1)]. Since the data is in the cache, it is a hit and the data requested is directly sent out from the cache to the analytics application that made the request.

Case (2). As opposed to case (1) above, if the data request timespan does not fall into any existing timespan of data blocks in the cache, it is completely a miss. So, in this data read case, the data requested is read out from the permanent storage, i.e., the system 100 accesses the time-series data store 120 to provide the requested data to the analytics application.

Case (3). In this data read case, the request timespan falls into a combination of two or more consecutive timespans of data blocks residing in the cache. That is, as shown in case (3) in FIG. 3, the analytics application requests the data block of entity[X] starting after start(2) and ending before end(3). As a result, the corresponding two data blocks are sent out from the cache 140 to the analytics application.

Case (4). In this data read case, the timespan requested is beyond the range covered by the existing timespans of data blocks in the cache 140. This is not a complete miss such as in case (2), but rather the data read request here partially falls into the timespans covered in the cache. So the data block starting after end(3), which has not been loaded into the cache 140 yet, has to be read out from the permanent storage (time-series data store 120), then it is combined with the block of [start(3), end(3)] in the cache as the final output.

In addition to high cache space utilization, illustrative embodiments realize that another key to better cache performance is an efficient caching algorithm which maintains the popular data blocks in the cache and replaces rarely used ones. Further improvements can be achieved when the replacement policy is combined with the decision whether the data block would be accessed in the near future.

Figure 4:
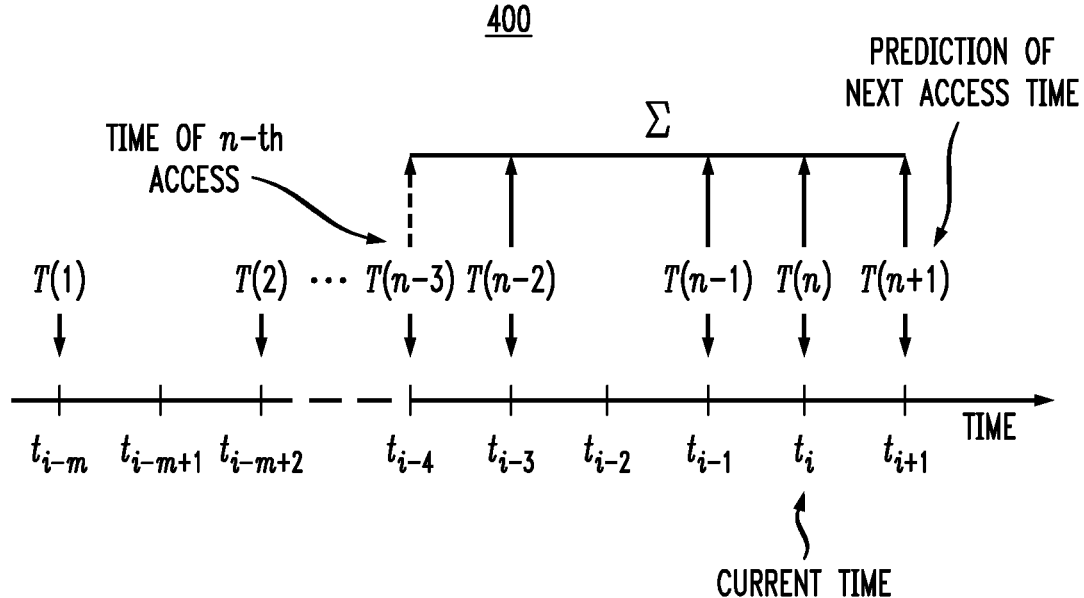
FIG. 4 illustrates prediction of the next access time of a data block for a time-series data cache, according to an embodiment of the invention.

Illustrative embodiments enhance the caching policy design with an estimate of next access time, considering its current and past access trends. Given the value of time difference $\Delta T = T(n+1) - T(n)$, where $T(n)$ is the time of current access, and $T(n+1)$ is the predicted time of next access, as shown in timeline 400 of FIG. 4. A data block with a small value of $\Delta T$ means that the block might be accessed in the very near future, so it would be rewarded so as to increase its priority of staying in the cache. However, the block with a large value of $\Delta T$ means that it might be accessed in the more distant future, so it would be punished via decreasing its priority thus increasing the possibility of it being removed from the cache.

In order to obtain such an estimate of access time difference, one illustrative embodiment utilizes the Taylor series. Without loss of generality, it is assumed that the access time trend of one data block x yields a function $T(x)$. As proven by the Taylor's theorem, a function can be approximated with a finite number of terms of its Taylor series, that is, a Taylor polynomial. Based on this, the $n^{th}$-degree Taylor polynomial $T_n(x)$ is as the approximation of $T(x)$, as shown in the following formula:

$$T_n(x) = \sum_{i=0}^{n} \frac{f^{(i)}(a)}{i!}(x-a)^i =$$

$$f(a) + \frac{f'(a)}{1!}(x-a) + \frac{f''(a)}{2!}(x-a)^2 + \ldots + \frac{f^{(n)}(a)}{n!}(x-a)^n$$

For simplicity, $T_n(x)$ is denoted as $T(n)$. Given is a time series $T(1), T(2), \ldots, T(n)$, where $T(n)$ is the reference time of $n^{th}$ access of the data block x. The $n^{th}$ polynomial can be used to get an approximate estimation $T(n+1)$, for example:

$$T(n+1) \approx T(n) + \frac{T'(n)}{1!} + \frac{T''(n)}{2!} + \ldots$$

where $$T'(n) = \frac{T(n) - T(n-k)}{k}$$

To take into account computational precision and complexity at the same time, the $2^{nd}$-order polynomial is used to predict the next access time, as shown in the following formula:

$$T(n+1) = \begin{cases} 2T(n) - T(n-1), & \text{1st-order} \\ [5T(n) - 4T(n-1) + T(n-2)]/2, & \text{2nd-order} \end{cases}$$

Regarding estimates of the next access time, the Taylor series is not the only possible way. Also, it could be assumed that the inter-access times follow an exponential distribution similar to the inter-arrival times in queueing theory, thus the exponential distribution's rate parameter can be estimated from the sample mean (e.g., using an exponentially weighted online algorithm). That is, the specific estimation method according to its precision performance could be used in a particular application scenario.

So far, as mentioned, the next access time estimation $T(n+1)$ can be used to build the replacement policy in the cache. Initially, a time difference threshold value D for replacement is defined:

When the system predicts that the next access of a data block would take place within the future timespan D, the block could be maintained in the cache.

When the system predicts that the next access would happen in the distant future beyond the pre-defined timespan, the block could be removed from the cache to release more space.

When there is insufficient space in the cache, data blocks having the greatest estimation value would be removed from the cache as the top priority.

Also, the time difference estimation $\Delta T$ can be applied to the priority formula in classical caching algorithms to build more comprehensive policies. For example, in the GDSF algorithm, the priority computation typically is:

$$\text{Priority} = \text{Clock} + \text{Hit\_Frequency} \times \frac{\text{Cost}}{\text{Size}}$$

Considering the time difference $\Delta T$, in accordance with an illustrative embodiment, the formula is modified as:

$$\text{Priority} = \text{Clock} + \text{Hit\_Frequency} \times \frac{\text{Cost}}{\text{Size}} \times \frac{1}{\Delta T}$$

That is, the data block that would be accessed in the very near future will get a higher priority.

In addition, if the system uses the logarithmic function log ($\Delta T$) then the impact of the parameter would be decreased against the impact of the original one.

It is also realized herein that time-series data requests from applications do not always require a fixed length of time, i.e., data blocks are stored in the cache for variant lengths of time. When the timespan requested is not aligned with the timespan of data block stored in the cache, specific rules to count the access time are employed.

Figure 5:
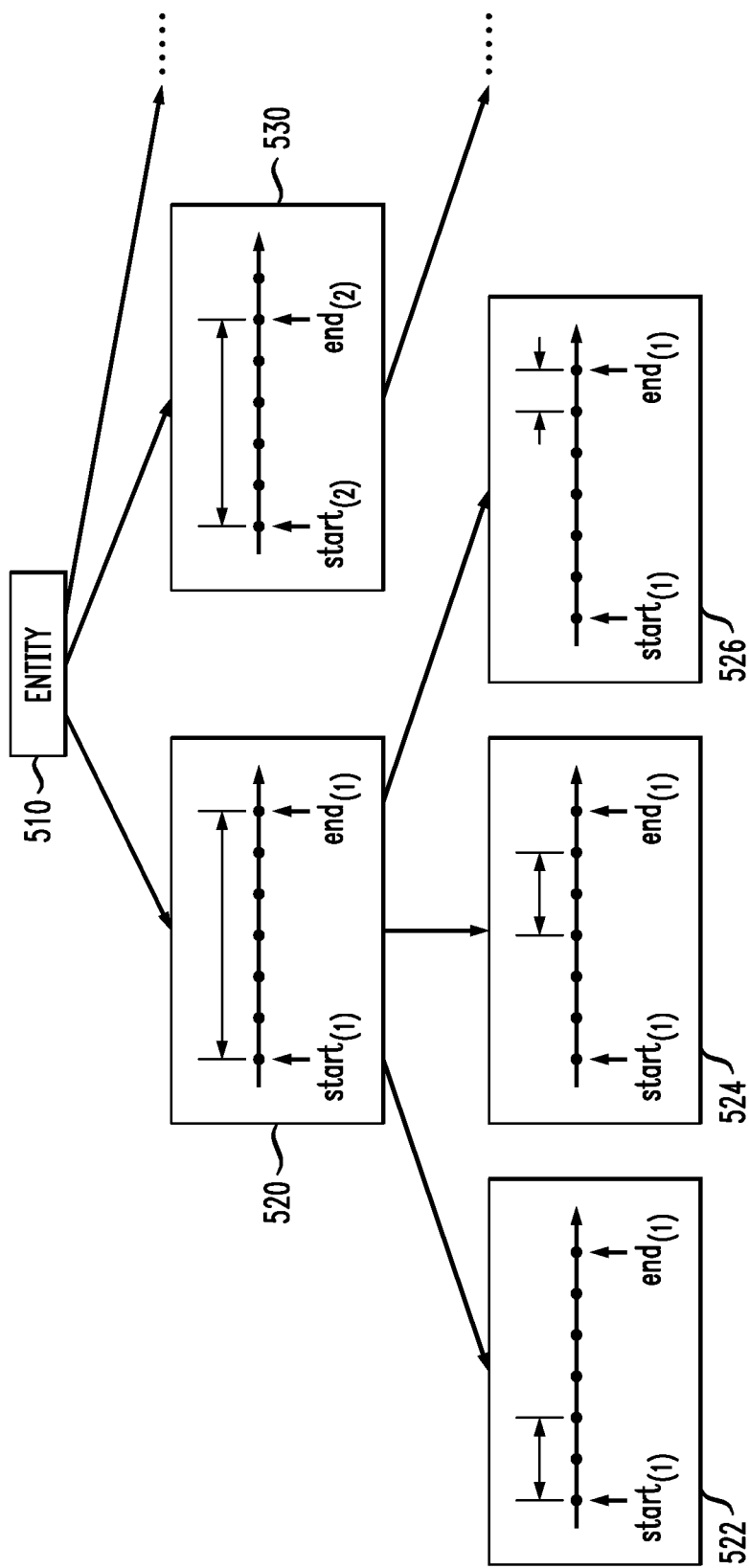
FIG. 5 illustrates a tree structure of logical timespan segments for a time-series data cache, according to an embodiment of the invention.

In one illustrative embodiment, the timespan of a data block in the cache is split into multiple logical segments upon occurrence of the request. For each entity, the correspondence between logical timespan segments and access time history is maintained in the form of a tree structure, e.g., tree 500 as shown in FIG. 5. For a given entity 510, each parent node 520 and 530 represents a logical timespan segment with its access history. In the case of parent node 520, access history nodes 522, 524, and 526 are shown (it is assumed in this example that parent node 530 has one or more similar child nodes which are not expressly shown). As shown in tree 500, the timespan of the node is included in the parent node (e.g., 520), while the timespans of the child nodes (e.g., 522, 524, and 526) do not overlap each other, and are sorted by time. Counting the access time is performed on one parent node and all its child nodes. Different cases are described separately as follows:

If the timespan requested does not fit any nodes in the tree, a new node is created below the root entity node.

If the timespan requested falls into or equals a certain node in the current tree, all nodes in the traversal path are updated with the current time as the latest access.

If the timespan requested partially falls into a node, similarly, all nodes in the path are updated; at the same time, a new node is created, as a child of the node that is at the lowest level of the path, to match the timespan segment not yet existing in the tree.

When a replacement decision on a certain data block is made, the branch or path in which the node corresponding to the block is the root will be deleted.

Such a tree structure design, as provided in illustrative embodiments, conveniently maintains the association between timespan and access history; and is also flexible to calculate the prediction of the next access time.

In one illustrative example, the time-series data caching design according to embodiments of the invention can be implemented in a micro-services architecture (MSA) platform to support monitoring and analytics on resource consumption and application performance. The MSA platform may comprise a web service with multiple MySQL nodes as a backend and built in Kubernetes. Workload is sent to the web service and long term execution data for resources consumed by container instances is collected. This collected data represents the time-series data. Then, the time-series data is stored (e.g., in time-series data store 120 with support from time-series data cache 140) in order to support time-series visualization and statistical analysis (e.g., analytics application(s) 130).

Figure 6:
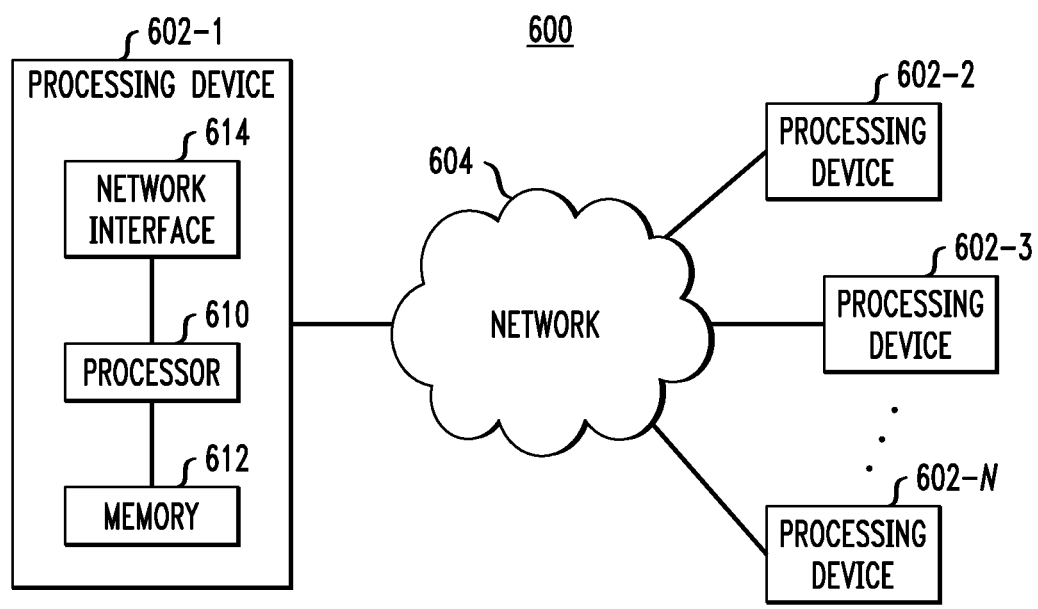
FIG. 6 illustrates a processing platform used to implement a time-series analysis system, according to an embodiment of the invention.

FIG. 6 illustrates a processing platform used to implement a time-series data analysis system, according to an embodiment of the invention.

As an example of a processing platform on which time-series data analysis system with time-series data caching functionalities (e.g., FIGS. 1-5) can be implemented is processing platform 600 shown in FIG. 6.

The processing platform 600 in this embodiment comprises a plurality of processing devices, denoted 602-1, 602-2, 602-3, . . . 602-N, which communicate with one another over a network 604. It is to be appreciated that the methodologies described herein may be executed in one such processing device 602, or executed in a distributed manner across two or more such processing devices 602. It is to be further appreciated that a server, a client device, a computing device or any other processing platform element may be viewed as an example of what is more generally referred to herein as a "processing device." As illustrated in FIG. 6, such a device generally comprises at least one processor and an associated memory, and implements one or more functional modules for instantiating and/or controlling features of systems and methodologies described herein. Multiple elements or modules may be implemented by a single processing device in a given embodiment.

The processing device 602-1 in the processing platform 600 comprises a processor 610 coupled to a memory 612. The processor 610 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 610. Memory 612 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 612 may comprise electronic memory such as random access memory (RAM), read-only memory (ROM) or other types of memory, in any combination. The one or more software programs when executed by a processing device such as the processing device 602-1 causes the device to perform functions associated with one or more of the components/steps of system/methodologies in FIGS. 2-8. One skilled in the art would be readily able to implement such software given the teachings provided herein. Other examples of processor-readable storage media embodying embodiments of the invention may include, for example, optical or magnetic disks.

Processing device 602-1 also includes network interface circuitry 614, which is used to interface the device with the network 604 and other system components. Such circuitry may comprise conventional transceivers of a type well known in the art.

The other processing devices 602 (602-2, 602-3, . . . 602-N) of the processing platform 600 are assumed to be configured in a manner similar to that shown for computing device 602-1 in the figure.

The processing platform 600 shown in FIG. 6 may comprise additional known components such as batch processing systems, parallel processing systems, physical machines, virtual machines, virtual switches, storage volumes, etc. Again, the particular processing platform shown in this figure is presented by way of example only, and the system shown as 600 in FIG. 6 may include additional or alternative processing platforms, as well as numerous distinct processing platforms in any combination.

Also, numerous other arrangements of servers, clients, computers, storage devices or other components are possible in processing platform 600. Such components can communicate with other elements of the processing platform 600 over any type of network, such as a wide area network (WAN), a local area network (LAN), a satellite network, a telephone or cable network, or various portions or combinations of these and other types of networks.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A system, comprising:
    at least one time-series data analytics application program;
    a time-series data store configured to persistently store time-series data; and
    a time-series data cache operatively coupled between the time-series analytics application program and the time-series data store, and configured to temporarily store portions of the time-series data;
    wherein the time-series data cache is further configured to be responsive to one or more data read requests received from the time-series analytics application program;
    wherein the time-series data cache is further configured to maintain a hierarchical tree structure comprising a plurality of nodes arranged in:
        a first level comprising two or more parent nodes corresponding to two or more logical timespan segments of an access history by the time-series analytics application program to a given portion of the time series data; and
        a second level comprising two or more child nodes for at least a given one of the two or more parent nodes, each of the two or more child nodes representing non-overlapping timespans within a given logical timespan segment of the given parent node;
    wherein the time-series data cache manages storage of at least the given portion of the time-series data by predicting a next data access time for the given portion of the time series data and determining a time difference between the predicted next data access time and a current access time for the given portion of the time series data determined utilizing the hierarchical tree structure, wherein the time difference is applied to one or more cache replacement algorithms implemented by the time-series data cache;
    wherein the time-series analytics application program, the time-series data store, and the time-series data cache are implemented on a set of one or more processing devices.

2. The system of claim 1, wherein the time-series data is stored in the time-series data cache in data blocks.

3. The system of claim 2, wherein a data block comprises one or more data points and is defined by a timespan having a start time and an end time.

4. The system of claim 3, wherein the data block further identifies an entity with which the data points are associated.

5. The system of claim 1, wherein the next access time is computed using a Taylor polynomial-based estimation process.

6. The system of claim 1, wherein the next access time is computed using an exponential distribution rate-based estimation process.

7. The system of claim 3, wherein at least one of the one or more data read requests comprises a data request timespan falling into one of an existing timespan of one or more data blocks currently loaded in the time-series cache such that the data read request is serviced from the time-series data cache.

8. The system of claim 3, wherein at least one of the one or more data read requests comprises a data request timespan that does not fall into an existing timespan of one or more data blocks currently loaded in the time-series cache such that the data read request is serviced from the time-series data store.

9. The system of claim 3, wherein at least one of the one or more data read requests comprises a data request timespan that falls into a combination of two or more consecutive timespans of data blocks currently loaded in the time-series data cache such that the data blocks of the two or more consecutive timespans are sent out from the time-series data cache to the time-series analytics application.

10. The system of claim 3, wherein at least one of the one or more data read requests comprises a data request timespan that partially falls into an existing timespan of one or more data blocks currently loaded in the time-series data cache such that a data block of the part of the timespan that is not currently loaded in the time-series data cache is obtained from the time-series data store and combined with a data block of the part of the timespan that is currently loaded in the time-series data cache, and then sent out from the time-series data cache to the time-series analytics application.

11. The system of claim 3, wherein the timespan of a data block in the time-series data cache is split into multiple logical segments upon occurrence of a given one of the one or more data read requests.

12. A method, comprising:
receiving, at a time-series data cache, one or more data read requests from at least one time-series data analytics application program, wherein the time-series data cache is operatively coupled between the time-series analytics application program and a time-series data store configured to persistently store time-series data, and the time-series data cache is configured to temporarily store portions of the time-series data;
maintaining, in the time series data cache, a hierarchical tree structure comprising a plurality of nodes arranged in:
a first level comprising two or more parent nodes corresponding to two or more logical timespan segments of an access history by the time-series analytics application program to a given portion of the time series data; and
a second level comprising two or more child nodes for at least a given one of the two or more parent nodes, each of the two or more child nodes representing non-overlapping timespans within a given logical timespan segment of the given parent node;
managing, at the time-series data cache, storage of at least the given portion of the time-series data by predicting a next data access time for the given portion of the time series data and determining a time difference between the predicted next data access time and a current access time for the given portion of the time series data determined utilizing the hierarchical tree structure, wherein the time difference is applied to one or more cache algorithms implemented by the time-series data cache; and
responding, via the time-series data cache, to the one or more data read requests received from the time-series analytics application program.

13. An article of manufacture comprising a processor-readable storage medium having encoded therein executable code of one or more software programs, wherein the one or more software programs when executed by at least one processing device implement the steps of:
receiving, at a time-series data cache, one or more data read requests from at least one time-series data analytics application program, wherein the time-series data cache is operatively coupled between the time-series analytics application program and a time-series data store configured to persistently store time-series data, and the time-series data cache is configured to temporarily store portions of the time-series data;
maintaining, in the time series data cache, a hierarchical tree structure comprising a plurality of nodes arranged in:
a first level comprising two or more parent nodes corresponding to two or more logical timespan segments of an access history by the time-series analytics application program to a given portion of the time series data; and
a second level comprising two or more child nodes for at least a given one of the two or more parent nodes, each of the two or more child nodes representing non-overlapping timespans within a given logical timespan segment of the given parent node;
managing, at the time-series data cache, storage of at least the given portion of the time-series data by predicting a next data access time for the given portion of the time series data and determining a time difference between the predicted next data access time and a current access time for the given portion of the time series data determined utilizing the hierarchical tree structure, wherein the time difference is applied to one or more cache algorithms implemented by the time-series data cache; and
responding, via the time-series data cache, to the one or more data read requests received from the time-series analytics application program.

14. The method of claim 12, wherein the time-series data is stored in the time-series data cache in data blocks.

15. The method of claim 14, wherein a data block comprises one or more data points and is defined by a timespan having a start time and an end time.

16. The system of claim 1, wherein the two or more child nodes for the given parent node are sorted by their associated non-overlapping timespans within the given logical timespan segment of the given parent node.

17. The system of claim 1, wherein maintaining the hierarchical tree structure comprises, responsive to receiving a data read access request for a given timespan of the given portion of the time series data that does not fit any existing nodes of the hierarchical tree structure, creating a new node for the given timespan.

18. The system of claim 1, wherein maintaining the hierarchical tree structure comprises, responsive to receiving a data read access request for a given timespan of the given portion of the time series data that falls entirely within the timespan of a subset of the one or more existing nodes of the hierarchical tree structure, updating an access time associated with each of the existing nodes of the hierarchical tree structure in a traversal path from the subset of the one or more existing nodes to a root node of the hierarchical tree structure.

19. The system of claim 1, wherein maintaining the hierarchical tree structure comprises, responsive to receiving a data read access request for a given timespan of the given portion of the time series data that falls partially within the timespan of a subset of the one or more existing nodes of the hierarchical tree structure:
updating an access time associated with each of the existing nodes of the hierarchical tree structure in a traversal path from the subset of the one or more existing nodes to a root node of the hierarchical tree structure; and
creating a new node in the hierarchical tree structure for a portion of the given timespan that does not fit any of the existing nodes of the hierarchical tree structure.

20. The system of claim 1, wherein maintaining the hierarchical tree structure comprises, responsive to performing cache replacement of the given portion of the time series data, removing existing nodes in the hierarchical tree structure for the given portion of the time series data.

* * * * *